(12) United States Patent
Bancroft

(10) Patent No.: US 12,245,708 B2
(45) Date of Patent: Mar. 11, 2025

(54) SYSTEMS FOR HANGING ARTICLES

(71) Applicant: Barbara Womble Bancroft, Dallas, TX (US)

(72) Inventor: Barbara Womble Bancroft, Dallas, TX (US)

(*) Notice: Subject to any disclaimer, the term of this patent is extended or adjusted under 35 U.S.C. 154(b) by 0 days.

(21) Appl. No.: 17/967,828

(22) Filed: Oct. 17, 2022

(65) Prior Publication Data
US 2023/0045766 A1 Feb. 9, 2023

Related U.S. Application Data

(63) Continuation of application No. 13/854,552, filed on Apr. 1, 2013, now abandoned.

(51) Int. Cl.
| | | |
|---|---|---|
| A47G 25/06 | (2006.01) | |
| A47F 5/08 | (2006.01) | |
| A47G 25/20 | (2006.01) | |
| A47G 25/40 | (2006.01) | |
| A47G 25/74 | (2006.01) | |
| F16B 2/08 | (2006.01) | |
| F16L 3/02 | (2006.01) | |
| F16L 3/08 | (2006.01) | |

(52) U.S. Cl.
CPC ............ *A47F 5/0838* (2013.01); *A47G 25/20* (2013.01); *A47G 25/4053* (2013.01); *A47G 25/0664* (2013.01); *A47G 25/0685* (2013.01); *A47G 25/0692* (2013.01); *A47G 25/746* (2013.01); *F16B 2/08* (2013.01); *F16L 3/02* (2013.01); *F16L 3/08* (2013.01)

(58) Field of Classification Search
CPC ... A47F 5/006; A47G 25/0685; A47G 25/746; A47G 25/0664; A47G 25/0692
USPC .. 248/689, 693, 316.1, 226.11, 231.71, 154; 211/100, 99, 96, 193
See application file for complete search history.

(56) References Cited

U.S. PATENT DOCUMENTS

| | | | | |
|---|---|---|---|---|
| D154,684 S | * | 8/1949 | Hufeld | D32/58 |
| 2,510,198 A | * | 6/1950 | Tesmer | B25B 5/006 248/231.71 |
| 2,905,423 A | * | 9/1959 | Smith | A47G 25/08 248/231.71 |
| 3,178,144 A | * | 4/1965 | Kimoto | F21V 21/08 248/312 |
| 3,451,558 A | * | 6/1969 | Cohen | D06F 95/008 211/119.005 |
| 5,108,058 A | * | 4/1992 | White | F16M 13/022 248/231.71 |
| 5,219,080 A | * | 6/1993 | Reyes | D06F 57/122 211/196 |
| D348,537 S | * | 7/1994 | Kotrba | D26/138 |
| 2004/0211868 A1 | * | 10/2004 | Holmes | F16M 13/022 248/231.71 |

* cited by examiner

*Primary Examiner* — Alfred J Wujciak
(74) *Attorney, Agent, or Firm* — Carrington, Coleman, Sloman & Blumenthal, LLP

(57) ABSTRACT

A system for the display and support of apparel includes a support arm which is attached to an horizontal surface such as a clothing bar or shelf. The support arm extends perpendicularly relative to the horizontal surface such that hanging apparel hung from the support arm is displayed with its front showing rather than from the side.

13 Claims, 3 Drawing Sheets

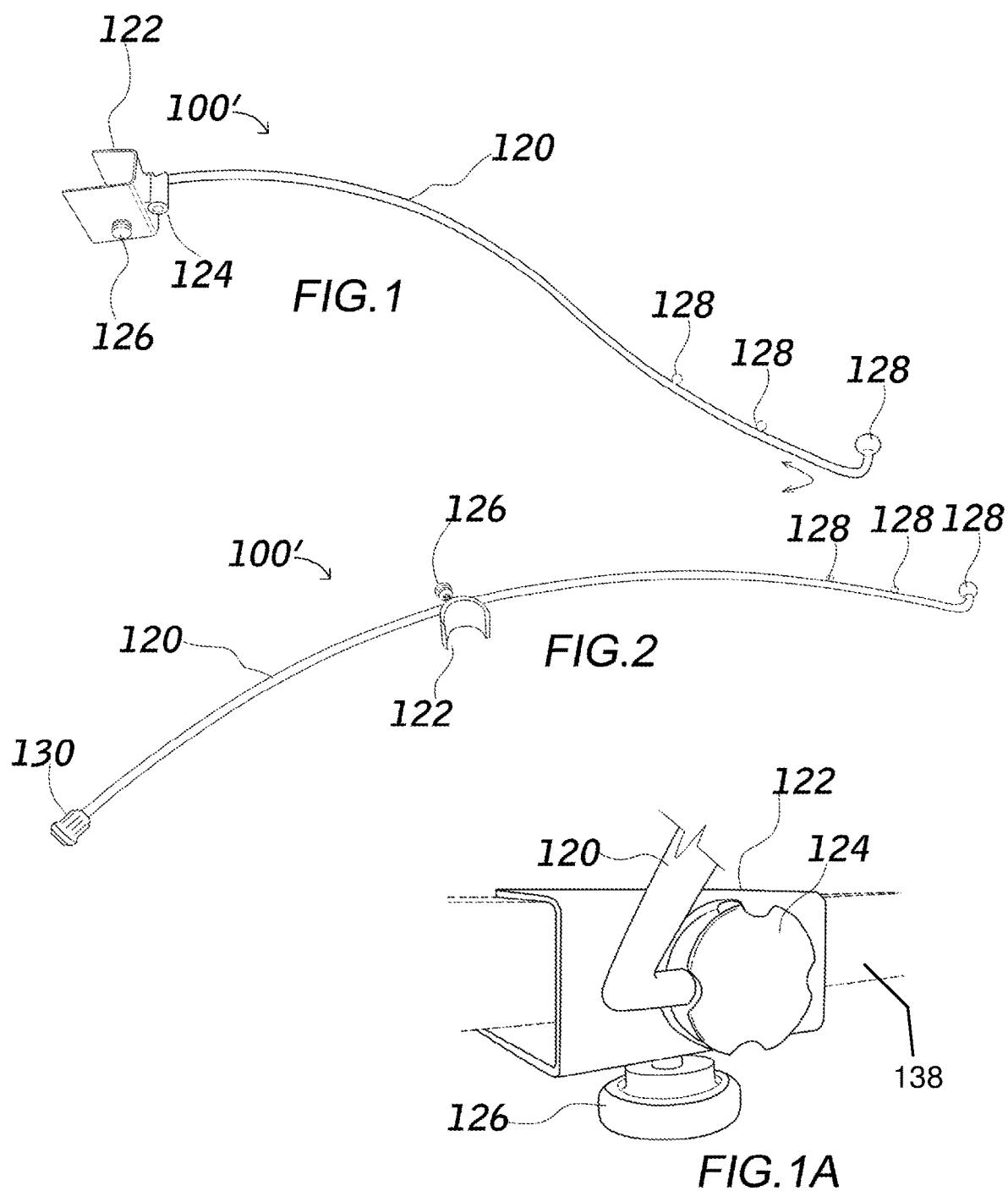

SYSTEMS FOR HANGING ARTICLES

CROSS REFERENCE TO RELATED APPLICATIONS

This application claims the benefit of U.S. Provisional Application No. 61/618,718 filed Mar. 31, 2012. Cross reference is also made to pending U.S. patent application Ser. No. 13/252,881 filed Oct. 4, 2011 which is incorporated by reference herein in its entirety.

FIELD OF THE INVENTION

The present invention relates generally to supports for hanging articles, and more specifically to support frames designed for the consumer market which can be mounted on a clothing bar or shelf for the support of hanging clothing or other articles.

BACKGROUND OF THE INVENTION

Within the merchandising environment, various displays are used to hang articles such as clothing. The most common display means for hanging garments are clothing bars which are most typically straight or circular in order to display garments for sale. The clothing bars used in commercial environments typically have a rectangular profile while those available to the consumer market have a cylindrical profile. Certain commercial clothing bars may also employ support frames which are attached to the clothing bars in order to showcase or enable sorting garments by type. Although commercial bars have more structural variation than clothing bars manufactured for non-commercial use, because of proprietary design, parts associated with commercial assemblies such as support frames and other accessories are not interchangeable with systems from other makers or with clothing bars manufactured for the consumer market such as those often sold as part of a closet storage solution.

While support apparatus are known that attach to vertically oriented poles, a support apparatus for hanging garments and other articles which is quickly attachable to a horizontally positioned cylindrical clothing bar without requiring additional tools or fasteners would be a valuable accessory to any consumer closet system.

Moreover, a such a retrofittable support frame would be especially desirable if it were strong enough to support multiple articles without slipping, relocatable to any position along the bar and easily removable.

SUMMARY OF THE INVENTION

The present invention is directed to a garment support for hanging articles that is reversibly attachable to horizontal supports such as clothing bars, shelves and the like. One embodiment according to the present invention is mounted to a typical clothing bar so as to project from the bar in order to display articles such as garments from the front rather than the sides. The garment support is especially useful for planning wardrobe changes, selecting items that need to be dry cleaned and many other wardrobe related tasks.

Multiple garment supports can attach along a clothing bar or a length of shelving to provide additional hanging space.

In one aspect according to the present invention, the garment support possesses a support frame which is firmly attachable to a horizontal cylindrical clothing bar as an attachment surface.

In another aspect according to the present invention, the garment support possesses a support frame which is firmly attachable to an edge of a solid shelf as an attachment surface.

In yet another aspect according to the present invention, portions of the garment support are extendible.

Inclusive to all the foregoing aspects, the support frame is easily re-positionable along the attachment surface of whatever kind.

The description as follows is not intended to limit the scope of the invention to the particular forms set forth, but on the contrary, it is intended to cover such alternatives, modifications, combinations and equivalents as may be included within the spirit and scope of the invention as set forth in the detailed description.

BRIEF DESCRIPTION OF THE DRAWINGS

FIG. 1 is a perspective view of one embodiment according to the present invention for attachment to an edge of a shelf;

FIG. 1A is a perspective view of one exemplary pivot hinge;

FIG. 2 is a perspective view of another embodiment according to the present invention for attachment to a cylindrical clothing bar;

DETAILED DESCRIPTION OF THE INVENTION

REFERENCE LISTING

Figure 3:
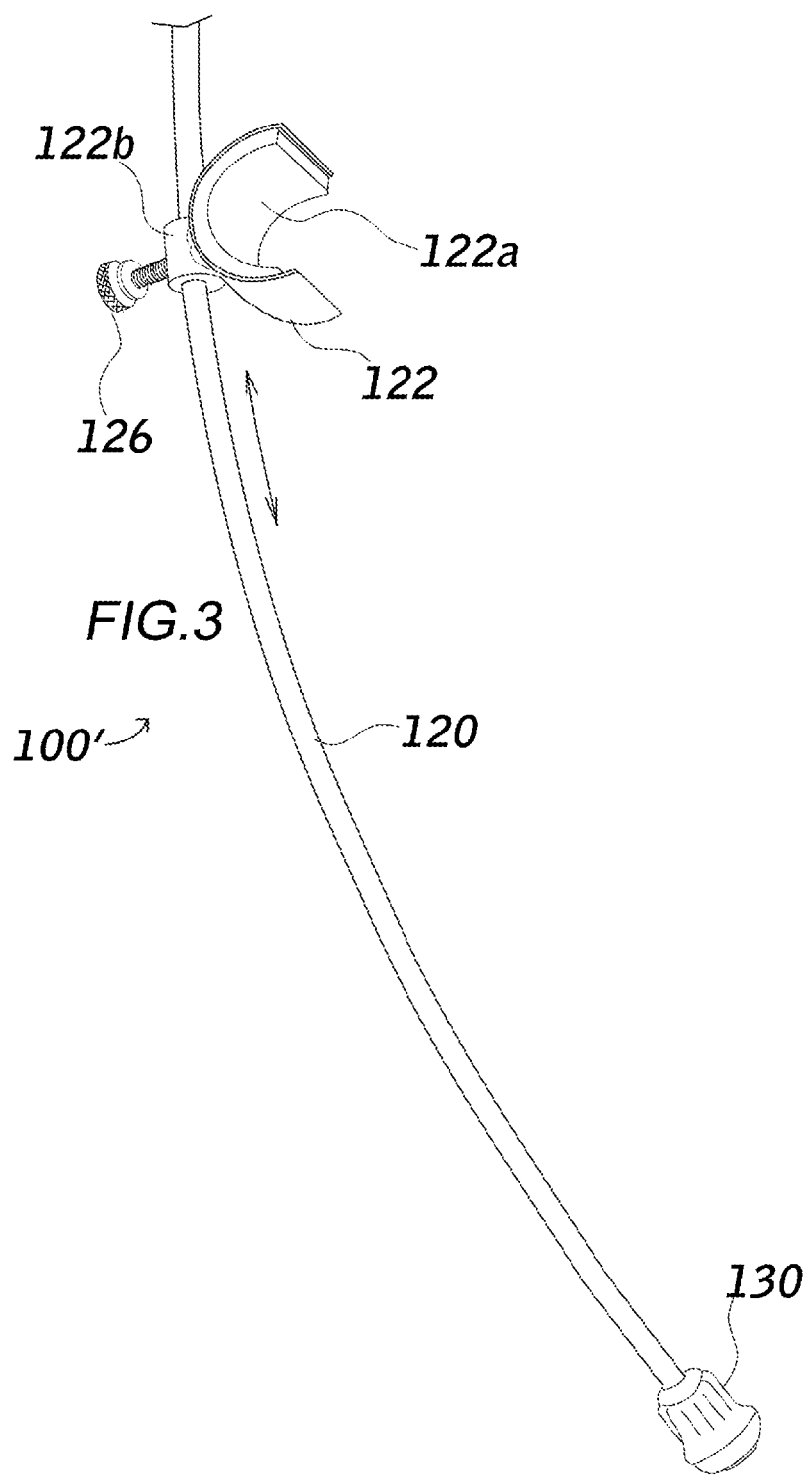
FIG. 3 is an enlarged perspective view of the embodiment shown in (FIG. 2) for attachment to a cylindrical clothing bar.

100' garment support
120 support frame
122 attachment member
122a pad
122b collar
124 pivot hinge
126 tightening member
128 stay
130 bumper
132 hook

DEFINITIONS

Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control.

In addition, the materials, methods, and examples are illustrative only and not intended to be limiting.

Referring generally to FIGS. 1-5, a garment support 100' for displaying garments includes a rigid support arm 120 with a attachment member 122 in which the support arm is secured generally perpendicularly to a horizontal structure such as a clothing bar 136 or shelf 138. FIG. 1 depicts a support arm attached to a shelf edge with a pivot 124 which includes an aperture that a section of the support arm fits within to permit the arm to pivot away from a perpendicular orientation relative to the shelf edge. Clothing is hung on the arm and retained in place by stays 128 which can be any portion of the arm that prevents a hanger hook from sliding unimpeded along the frame. While in the particular embodiment shown, the stays are spherical members permanently affixed along the arm, it should be understood that other stays will suggest themselves top those having the skill in the art; for example, collars with a frictional fit that slide along a cylindrical or rod-shaped frame, or which are tightened at any point along the frame by set screws.

FIG. 2 shows another embodiment according to the present invention with a semi-cylindrical attachment member that rests over a clothing bar installed in a closet. In a normal use, the end of the frame with stays 128 projects outwardly from the clothing bar, while the opposite end of the arm 120 possesses a rubber bumper 130 braced against the rear wall of the closet. The bracing effect permits the clothing bar to support the weight of several garments facing out to assist in garment selection. FIG. 3 is an enlarged partial view of the embodiment shown in (FIG. 2). The amount of arm projecting from either the front or back can be adjusted by adjusting tightening member 126 which is shown here as a set screw that when loosened permits the arm to slide back and forth through collar 122b. Preferably, the attachment member is lined with a material 122a of any suitably non-marring material such as a rubber or felt pad. In effect, the arm is supported superiorly to the closet rod and can be easily installed thereon and removed. Weight of the garments increases the inertia of the arm by forcing bumper 130 against a back wall or against the underside of a closet shelf.

Figure 4:
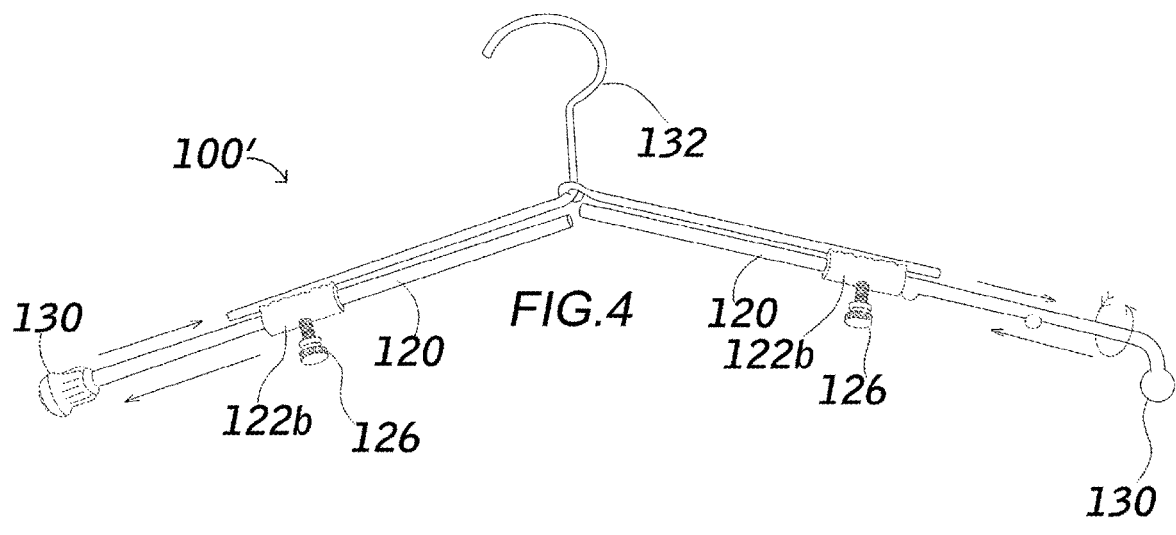
FIG. 4 is a perspective view of another embodiment according to the present invention for attachment to a cylindrical clothing bar.
Figure 5:
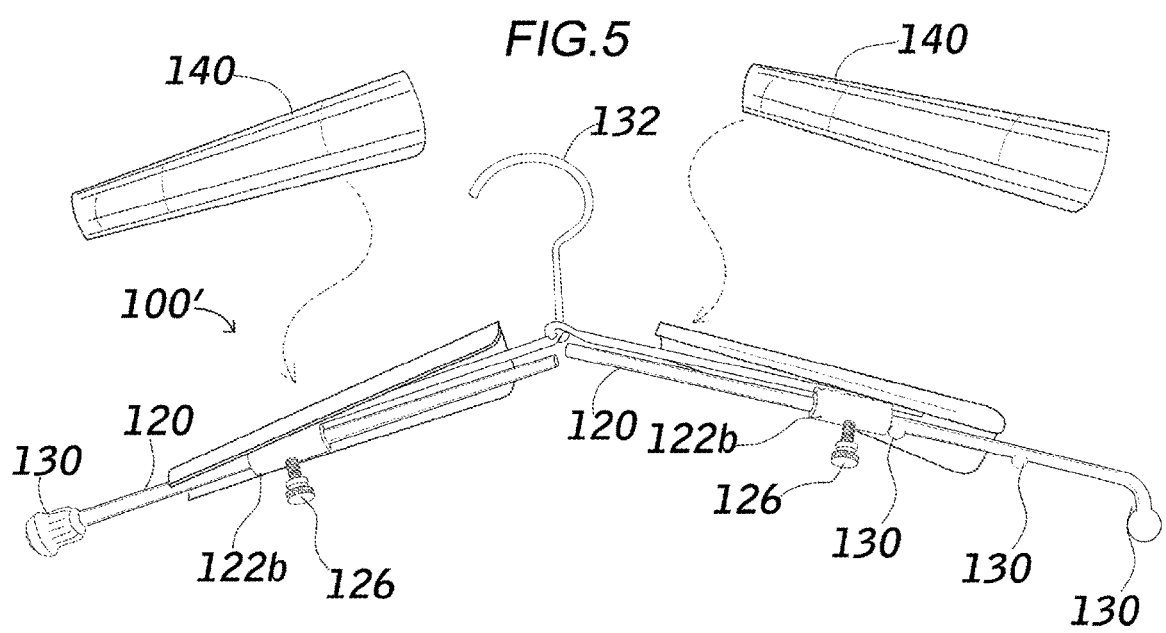
FIG. 5 is a perspective view of the embodiment shown in (FIG. 4) with attachable shoulder supports.

Another preferred embodiment shown in FIGS. 4 and 5, is hung from a clothing rod by hook 132. An upper portion of a frame is fixed, while the lower srm portions 120 telescope by sliding back and forth through collar 122b similar to the embodiment shown in FIG. 2. One arm segment is capped by bumper 130 which is for bracing against the back wall of a closet. Both arm segments can be rotated axially and extended/retracted by loosening thumbscrew 126. FIG. 5 shows a pair of attachable shoulder supports 140 for the shielding of garments from projecting portions of the frame.

While the invention has been described by the particular embodiments given, it is not intended that the scope of the invention be limited to the particular forms set forth. For example, the attachment member can be combined with any one of the support frames shown. The attachment member can be a spring clip or other clamping means that will suggest themselves to those skilled in the art. Whatever the attachment means to the clothing bar, it is intended that the garment support resist side to side movement experienced by conventional closet hangers. Accordingly, the invention is intended to cover such alternatives, modifications, and equivalents as may be included within the spirit and scope of the invention as described and shown in the disclosure.

The invention claimed is:

1. A system for support and display of hanging articles and for mounting to a horizontal attachment surface, the system comprising:
    a support arm including a first end and a second end;
    multiple stays disposed at various locations along the support arm; and
    an attachment member including a first portion and a second portion, the first portion of the attachment member configured to fixedly couple to the horizontal attachment surface, and the second portion of the attachment member configured to couple to the first end of the support arm so that:
        the support arm can rotate around the first end independently of whether the attachment member is fixedly coupled to the horizontal attachment surface;
        the support arm comprises a length portion that extends away from the first end; and
        a majority of the length portion extends in a descending and non-vertical direction away from the first end, and wherein each stay, in the multiple stays, is configured to retain a portion of a hanger so as to impede the hanger from sliding in the descending and non-vertical direction; and
    wherein the horizontal attachment surface comprises a shelf.

2. The system according to claim 1, wherein the majority of the length portion comprises an arcuate shape.

3. The system according to claim 1,
    wherein the majority of the length portion comprises a first arcuate portion and a second arcuate portion, the first arcuate portion curved in a first direction and the second arcuate portion curved in a second direction that is opposite the first direction; and
    wherein the first arcuate portion is connected to the second arcuate portion.

4. The system according to claim 3, wherein an end of the first arcuate portion is the first end, and an end of the second arcuate portion is the second end.

5. The system according to claim 1, wherein the attachment member comprises a top plate and a bottom plate, the top plate configured to abut in a position relative to a top of the shelf and the bottom plate configured to abut in a position relative to a bottom of the shelf.

6. The system according to claim 1:
    wherein the horizontal attachment surface presents a front-facing surface extending in a first planar dimension; and
    wherein, when the attachment member is fixedly coupled to the horizontal attachment surface, the support arm extends away from the front-facing surface and can rotate approximately 180 degrees relative to a rotational axis coupled to the attachment member and without passing behind the first planar dimension.

7. The system according to claim 1:
    wherein the support arm can rotate around a rotational axis;
    wherein the support arm extends outward and away from a vertical point along the rotation axis; and
    wherein the multiple stays are disposed at various locations along the support arm below the vertical point.

8. The system according to claim 7, wherein each of the multiple stays protrudes upward.

9. The system according to claim 1:
    wherein the support arm can rotate around a rotational axis;

wherein the support arm has a pivotal length extending outward and away from a vertical point along the rotation axis and to a distal tip; and wherein a majority of the pivotal length extends in a descending and non-vertical direction away from the vertical point.

10. The system according to claim 1:

wherein the support arm comprises a rigid support arm; and wherein the rigid support arm can rotate around the first end after the attachment member is fixedly coupled to the horizontal attachment surface.

11. A system for support and display of hanging articles and for mounting to a horizontal attachment surface, the system comprising:

a support arm including a first end and a second end;

multiple stays disposed at various locations along the support arm; and an attachment member including a first portion and a second portion, the first portion of the attachment member configured to fixedly couple to the horizontal attachment surface, and the second portion of the gripping member configured to couple to the first end of the support arm so that:

the support arm can rotate around the first end independently of whether the gripping member is fixedly coupled to the horizontal attachment surface;

the support arm comprises a length portion that extends away from the first end; and a majority of the length portion extends in a descending and non-vertical direction away from the first end, and wherein each stay, in the multiple stays, is configured to retain a portion of a hanger so as to impede the hanger from sliding in the descending and non-vertical direction:

wherein the attachment member comprises a first plate and a second plate to fixedly couple to the horizontal attachment surface;

wherein the support arm can rotate around a rotational axis;

wherein the support arm extends outward and away from a vertical point along the rotation axis; and wherein the vertical point is positioned between the first plate and the second plate.

12. A system for support and display of hanging articles and for mounting to a horizontal attachment surface, the system comprising:

a support arm including a first end and a second end;

multiple stays disposed at various locations along the support arm; and an attachment member including a first portion and a second portion, the first portion of the attachment member configured to fixedly couple to the horizontal attachment surface, and the second portion of the attachment member configured to couple to the first end of the support arm so that:

the support arm can rotate around the first end independently of whether the gripping member is fixedly coupled to the horizontal attachment surface;

the support arm comprises a length portion that extends away from the first end; and a majority of the length portion extends in a descending and non-vertical direction away from the first end, and wherein each stay, in the multiple stays, is configured to retain a portion of a hanger so as to impede the hanger from sliding in the descending and non-vertical direction;

wherein the attachment member comprises a top plate, a bottom plate, and a vertical plate between the top plate and the bottom plate;

wherein the support arm can rotate around a rotational axis parallel to the vertical plate;

wherein the support arm extends outward and away from a vertical point along the rotation axis; and wherein the vertical point is horizontally aligned with the top plate.

13. The system according to claim 12, wherein each of the stays is spherical and protrudes away from a frame of the support arm.

* * * * *